United States Patent [19]
Conboy

[11] Patent Number: 5,727,500
[45] Date of Patent: Mar. 17, 1998

[54] LEASH-MOUNTED STORAGE DEVICE

[76] Inventor: Meg Conboy, 4040 Panama Ct., Oakland, Calif. 94611

[21] Appl. No.: 629,369

[22] Filed: Apr. 8, 1996

[51] Int. Cl.[6] .......................... A01K 23/00; A01K 27/00
[52] U.S. Cl. ........................ 119/174; 119/795; 119/858
[58] Field of Search .............................. 119/792, 793, 119/795, 797, 858, 174, 867; 294/1.3, 1.4, 1.5

[56] References Cited

U.S. PATENT DOCUMENTS

| | | | |
|---|---|---|---|
| 5,363,809 | 11/1994 | Roe | 119/792 |
| 5,441,017 | 8/1995 | Lindsay | 119/858 X |
| 5,560,321 | 10/1996 | Hess | 119/858 |

Primary Examiner—Robert P. Swiatek
Assistant Examiner—Elizabeth Shaw
Attorney, Agent, or Firm—Jack Lo

[57] ABSTRACT

A leash-mounted storage device includes front and rear pouches attached together and forming a channel therebetween. The front pouch includes a front opening for receiving a supply of disposable bags for picking up pet droppings. The rear pouch includes a top opening for receiving dirty bags after they are filled with animal waste. First and second hook-and-loop fastening straps are attached to the front pouch adjacent the opposite ends of the channel. The storage device is attached to a pet leash by slipping the leash through the channel, wrapping the first fastening strap through the hand loop of the leash, and wrapping the second fastening strap around an intermediate portion of the leash. Thus the storage device is securely attached to the leash. Instead of holding pet droppings, the storage device may also be used for holding a variety of other pet related items, such as pet toys, pet medication, water container, water dish, etc., or it may be used for holding personal items, such as keys, wallet, etc.

5 Claims, 1 Drawing Sheet

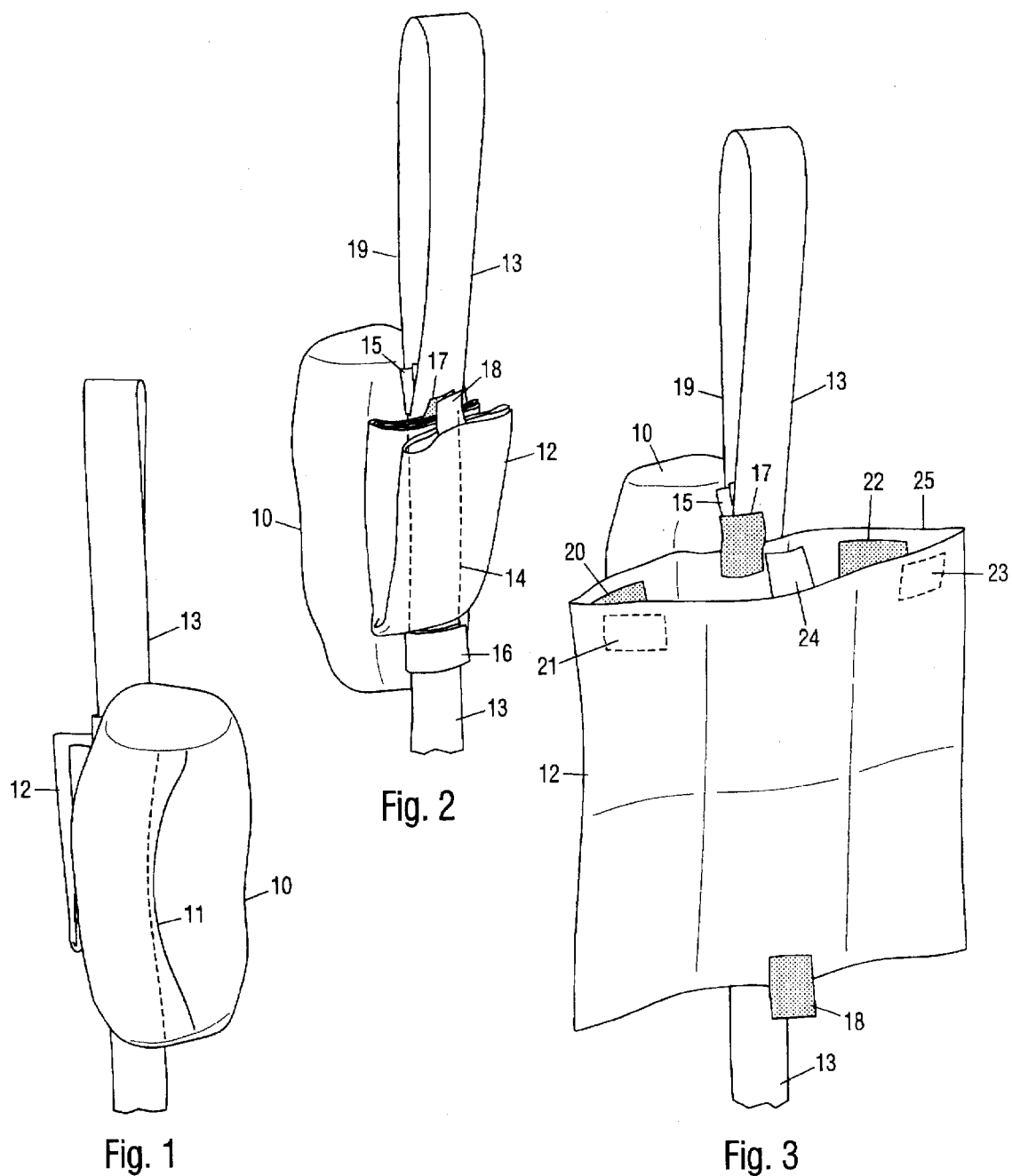

LEASH-MOUNTED STORAGE DEVICE

BACKGROUND OF THE INVENTION

1. Field of the Invention

This invention relates generally to storage pouches, specifically to a storage device for being attached to a pet leash.

2. Prior Art

Responsible pet owners pick up their pets' droppings so as to keep public areas clean, and to comply with some local regulations, commonly known as "pooper-scooper" ordinances. Some pet owners use a scoop to lift the droppings into a plastic bag. Some put a plastic bag over a hand, like a glove, pick up the droppings by hand, and invert the bag over the droppings. Sometimes several bags must be used if the animal defecates several times during a walk. In any case, it is inconvenient and disgusting to hold the dirty bags in one's hand or pocket. Although there are special devices for picking up animal droppings, these are relatively large and heavy, so that few pet owners are willing to carry them on a pleasure walk.

U.S. Pat. No. 5,363,809 to Roe (1994) discloses a collar-mounted carrying pouch for carrying disposable, pet sanitary bags. It is formed by a fabric tube with closeable opposite ends. The tube is tied into a bow to form two separate compartments for carrying disposable bags. The bow is attached to a pet's collar by a diagonal strap. However, the single strap allows the bow to wobble. The disposable bags, when filled, must be carried by hand until they can be deposited in a garbage receptacle, which is hard to find in public areas. In addition, the pet must carry the uncomfortable bulk of the bow on its neck. The discomfort to the pet is further aggravated by the wobbling bow.

OBJECTS OF THE INVENTION

Accordingly, an object of the present invention is to provide a leash-mounted storage device that is stable when mounted on a leash.

Another object of the present invention is to provide a leash-mounted storage device that is lightweight.

Another object of the present invention is to provide a leash-mounted storage device that does not encumber the pet.

Another object of the present invention is to provide a leash-mounted storage device that stays with the leash after the leash is detached from the pet, so that it will not easily become lost.

Another object of the present invention is to provide a leash-mounted storage device that is easily detachable from the leash for cleaning.

Another object of the present invention is to provide a leash-mounted storage device that may hold a supply of disposable bags for picking up pet droppings.

Yet another object of the present invention is to provide a leash-mounted storage device that may hold the dirty bags, so that the pet owner does not have to carry them by hand, or look for a hard-to-find public garbage receptacle to dispose of them.

Still another object of the present invention is to provide a leash-mounted storage device that may be used to carry a variety of other items.

Further objects of the present invention will become apparent from a consideration of the drawings and ensuing description.

SUMMARY OF THE INVENTION

A leash-mounted storage device includes front and rear pouches attached together and forming a channel therebetween. The front pouch is usable for holding a supply of disposable bags, and the rear pouch is usable for holding the dirty bags after they are filled with animal droppings. A pair of fastening straps are attached to the front pouch adjacent the opposite ends of the channel. The storage device is attached to a conventional pet leash by passing the leash through the channel, wrapping one of the straps through the hand loop of the leash, and wrapping the other strap around an intermediate portion of the leash.

BRIEF DESCRIPTION OF THE DRAWINGS

FIG. 1 is a front perspective view of a leash-mounted storage device in accordance with a preferred embodiment of the invention.

FIG. 2 is a rear perspective view of the leash-mounted storage device in a folded condition.

FIG. 3 is a rear perspective view of the leash-mounted storage device in an open condition.

DRAWING REFERENCE NUMERALS

| | |
|---|---|
| 10. Front Pouch | 11. Opening |
| 12. Rear Pouch | 13. Leash |
| 14. Channel | 15. Hook-And-Loop Fastening Strap |
| 16. Hook-And-Loop Fastening Strap | 17. Hook-And-Loop Fastening Tab |
| 18. Hook-And-Loop Fastening Tab | 19. Hand Loop |
| 20–24. Hook-And-Loop Fastening Patches | 25. Opening |

DETAILED DESCRIPTION OF THE INVENTION

In accordance with a preferred embodiment of the invention shown in the front perspective view of FIG. 1, a leash-mounted storage device includes a lightweight, cylindrical front pouch 10 with a longitudinal, overlapping opening 11 for receiving a supply of disposable bags (not shown). A lightweight rear pouch 12 is attached to the back of front pouch 10, which is removably attached to a conventional pet leash 13.

As shown in the rear perspective view of FIG. 2, rear pouch 12 is in a folded condition. Rear pouch 12 is attached to front pouch 10 so as to form a channel 14 therebetween. First and second hook-and-loop fastening straps 15 and 16, respectively, are attached in spaced positions on the back of pouch 10, adjacent opposite ends of channel 14. Rear pouch 12 is kept in a folded condition by a pair of hook-and loop fastening tabs 17 and 18.

The storage device is mounted on leash 13 by passing the leash through channel 14, wrapping strap 15 through a hand loop 19 of leash 13, and wrapping strap 16 around an intermediate portion of leash 13. The storage device is thus securely attached to leash 13, and is prevented from sliding down by strap 15. It is entirely supported by the user, so that it will not encumber the pet. It will stay with leash 13 after the leash is detached from the pet, so that it will not easily be lost. It is attached to leash 13 at two spaced apart points by straps 15 and 16, so that it will not swing about annoyingly during a walk.

As shown in the rear perspective view of FIG. 3, rear pouch 12 may be unfolded for conveniently holding dirty bags (not shown) filled with animal droppings. Hook-and-loop fastening patches 20–24 are usable for closing a top opening 25 of rear pouch 12. The dirty bags may thus be conveniently carried in rear pouch 12 until the pet owner encounters a public garbage receptacle, or upon returning home. The storage device may also be easily removed from leash 13 for cleaning by untying straps 15 and 16, and sliding leash 13 out of channel 14.

SUMMARY, SUBSTITUTES, AND SCOPE

Accordingly, I have provided a leash-mounted storage device usable for holding a supply of disposable bags for picking up pet droppings. It is usable for conveniently holding the dirty bags, so that the pet owner does not have to carry them by hand, or have to immediately find a public garbage receptacle. It is mounted adjacent the hand loop of a leash, so that it is entirely supported by the user, and it will not encumber the pet. It is stable on the leash, so that it will not swing about annoyingly. It is lightweight, and it may be easily detached from the leash for cleaning.

Although the above descriptions are specific, they should not be considered as limitations on the scope of the invention, but only as examples of the embodiments. Many substitutes and variations are possible within the teachings of the invention. For example, hook-and-loop fastening straps 15 and 16 may be replaced with straps having buckles, or other suitable fastening devices. Hook-and-loop fastening patches 20–24 may be replaced with a zipper. Hook-and-loop fastening tabs 17 and 18 may be replaced with a pair of snaps. Opening 11 of front pouch 10 may be made sealable with hook-and-loop fasteners or a zipper. The front pouch may be used for carrying the dirty bags, and the rear pouch may be used for carrying the supply of disposable bags. Instead of carrying animal waste, the storage device may be used for carrying a variety of other items. Therefore, the scope of the invention should be determined by the appended claims and their legal equivalents, not by the examples given.

I claim:

1. A storage device for attaching to a pet leash with a hand loop, comprising:

a front pouch;

a rear pouch attached in abutting engagement to said front pouch so as to form a channel therebetween, said channel being adapted to be positioned around said leash so that said storage device can be supported on said leash; and a strap attached to said front pouch adjacent one end of said channel, said strap being adapted to be wrapped through said hand loop for preventing said storage device from sliding along said leash.

2. The storage device of claim 1 wherein said strap comprises a hook-and-loop fastening strap.

3. The storage device of claim 1, further including a front opening arranged on said front pouch.

4. The storage device of claim 1, further including a top opening arranged on said rear pouch.

5. A storage device for attaching to a pet leash with a hand loop, comprising:

a front pouch having a front opening;

a rear pouch attached to said front pouch so as to form a channel therebetween, said channel being adapted to be positioned around said leash so that said storage device can be supported on said leash, said rear pouch having a top opening;

a plurality of hook-and-loop fastening patches arranged around said top opening of said rear pouch for closing said rear pouch; and a first hook-and-loop fastening strap and a second hook-and-loop fastening strap attached to said front pouch adjacent opposite ends of said channel, said first hook-and-loop fastening strap being adapted to be wrapped through said hand loop to prevent said storage device from sliding along said leash, said second hook-and-loop fastening strap being adapted to be wrapped around an intermediate portion of said leash.

* * * * *